(12) United States Patent
Rahman et al.

(10) Patent No.: US 10,298,738 B2
(45) Date of Patent: May 21, 2019

(54) MULTIMEDIA MESSAGING SERVICE COMMUNICATION USING A TWO WAY PUSH CONNECTION

(71) Applicant: Verizon Patent and Licensing Inc., Basking Ridge, NJ (US)

(72) Inventors: SM Masudur Rahman, Somerset, NJ (US); Ying Sun, Enola, PA (US); Zulfiqer Sekender, Piscataway, NJ (US); Sankar Shanmugam, Dayton, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/793,027

(22) Filed: Oct. 25, 2017

(65) Prior Publication Data
US 2018/0048757 A1    Feb. 15, 2018

Related U.S. Application Data

(62) Division of application No. 14/312,151, filed on Jun. 23, 2014, now Pat. No. 9,819,785.

(51) Int. Cl.
*H04L 12/18*     (2006.01)
*H04L 12/58*     (2006.01)
*H04M 1/725*     (2006.01)
*H04W 4/12*      (2009.01)

(52) U.S. Cl.
CPC .... *H04M 1/72547* (2013.01); *H04L 12/1859* (2013.01); *H04L 51/10* (2013.01); *H04W 4/12* (2013.01)

(58) Field of Classification Search
CPC ...... H04W 4/12; H04M 1/72547; H04L 51/10
See application file for complete search history.

(56) References Cited

U.S. PATENT DOCUMENTS

| | | | |
|---|---|---|---|
| 2009/0106455 A1* | 4/2009 | Xu | H04L 51/34 709/248 |
| 2010/0306080 A1 | 12/2010 | Trandal | |
| 2011/0083111 A1 | 4/2011 | Forutanpour | |
| 2011/0141974 A1* | 6/2011 | Lieberman | H04L 51/38 370/328 |
| 2011/0276636 A1* | 11/2011 | Cheng | H04L 69/18 709/206 |
| 2012/0021781 A1* | 1/2012 | Aaltonen | H04L 51/34 455/466 |
| 2012/0066630 A1 | 3/2012 | Kim | |

(Continued)

*Primary Examiner* — Qun Shen

(57) ABSTRACT

Systems and methods for generating and transmitting multimedia messaging service (MMS) messages are disclosed. In some implementations, a mobile device presents, at a touchscreen, a visual user interface. The visual user interface includes multiple thumbnails and multiple contact blocks. Each thumbnail identifies a file. Each contact block identifies a contact having a messaging address. The mobile device receives, via the touchscreen, a selection of a first thumbnail from the multiple thumbnails. The mobile device receives, via the touchscreen, an indication of dragging the first thumbnail across the visual user interface to a first contact block. The mobile device transmits, responsive to the dragging of the first thumbnail to the first contact block, the file identified in the thumbnail to the messaging address of the contact identified in the first contact block.

20 Claims, 10 Drawing Sheets

(56) References Cited

U.S. PATENT DOCUMENTS

| | | | |
|---|---|---|---|
| 2012/0188064 A1* | 7/2012 | Mahaffey | H04L 63/1441 340/384.1 |
| 2012/0190325 A1* | 7/2012 | Abu-Hakima | H04W 4/90 455/404.2 |
| 2013/0024821 A1 | 1/2013 | Lee | |
| 2013/0080954 A1* | 3/2013 | Carlhian | H04M 1/274583 715/769 |
| 2013/0237204 A1* | 9/2013 | Buck | H04M 1/72569 455/418 |
| 2014/0047349 A1* | 2/2014 | Kulkarni | G06F 3/0482 715/739 |
| 2015/0026241 A1* | 1/2015 | Sebastian | H04L 12/1859 709/203 |
| 2015/0373181 A1 | 12/2015 | Rahman et al. | |

* cited by examiner

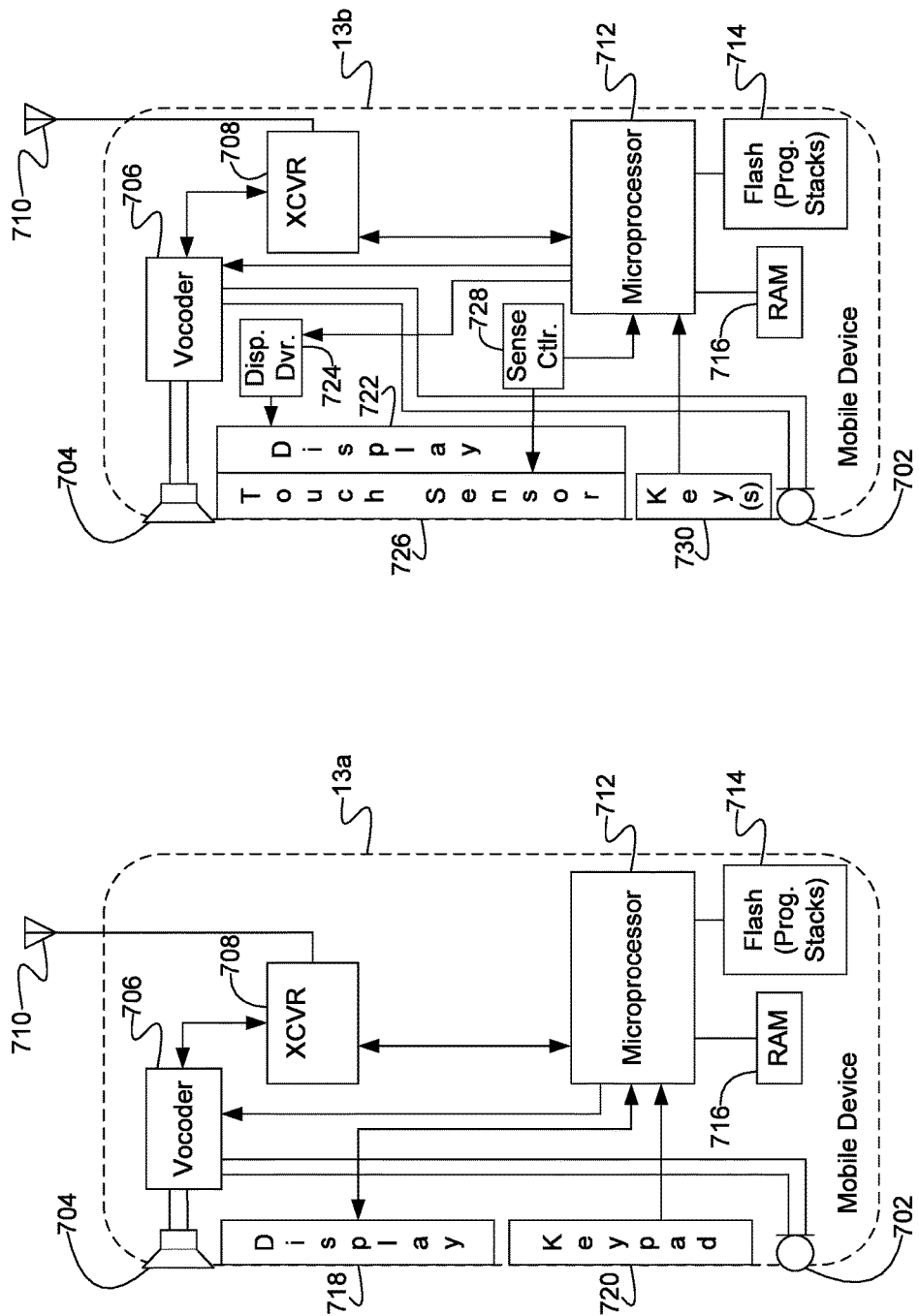

MULTIMEDIA MESSAGING SERVICE COMMUNICATION USING A TWO WAY PUSH CONNECTION

CROSS-REFERENCES TO RELATED APPLICATIONS

This application is a divisional of U.S. application Ser. No. 14/312,151, entitled "Multimedia Messaging Service Communication Using A Two Way Push Connection", filed on Jun. 23, 2014, the entirety of which is incorporated by reference herein.

BACKGROUND

Oftentimes, users of mobile devices send multimedia messaging service (MMS) messages to one another to share images or videos. However, existing MMS messaging technologies suffer from many drawbacks. At the mobile device, the application for sending MMS messages is oftentimes unintuitive, requiring the user to learn complex schemes for selecting an image or a video, selecting a contact, and having the image or the video transmitted to the contact. At the server, the application for sending MMS messages may only be able to handle small file sizes or may experience significant delay due to a large number of large files being transmitted and "bottleneck" at the server, resulting in slow transmission of messages and reduction of file sizes of images or videos being transmitted. As the foregoing illustrates, new approaches for MMS applications at mobile devices and MMS transmission at servers may be desirable.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 7 is a high-level functional block diagram of an exemplary non-touch type mobile device which may be involved in multimedia messaging service communication;

FIG. 8 is a high-level functional block diagram of an exemplary touch screen type mobile device which may be involved in multimedia messaging service communication;

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The subject technology provides techniques for multimedia messaging service (MMS) communication. Some aspects of the subject technology are directed to an MMS messaging application at a mobile device, which may include a touchscreen. Some aspects of the subject technology are directed to server-side MMS transmission techniques. Advantageously, according to some implementations of the subject technology, MMS communication may be more intuitive for mobile device users and more user-friendly than previously available alternative MMS technologies. At the server side, the MMS communication technology may be able to transmit larger data files and provide users with a real-time confirmation that their MMS messages have been successfully transmitted. Additionally, user privacy may be protected by storing less information about users at the server. Specifically an MMS message file may be stored at the server before the file is transmitted to the recipient, but not after successful receipt of the file by the recipient.

Figure 1:
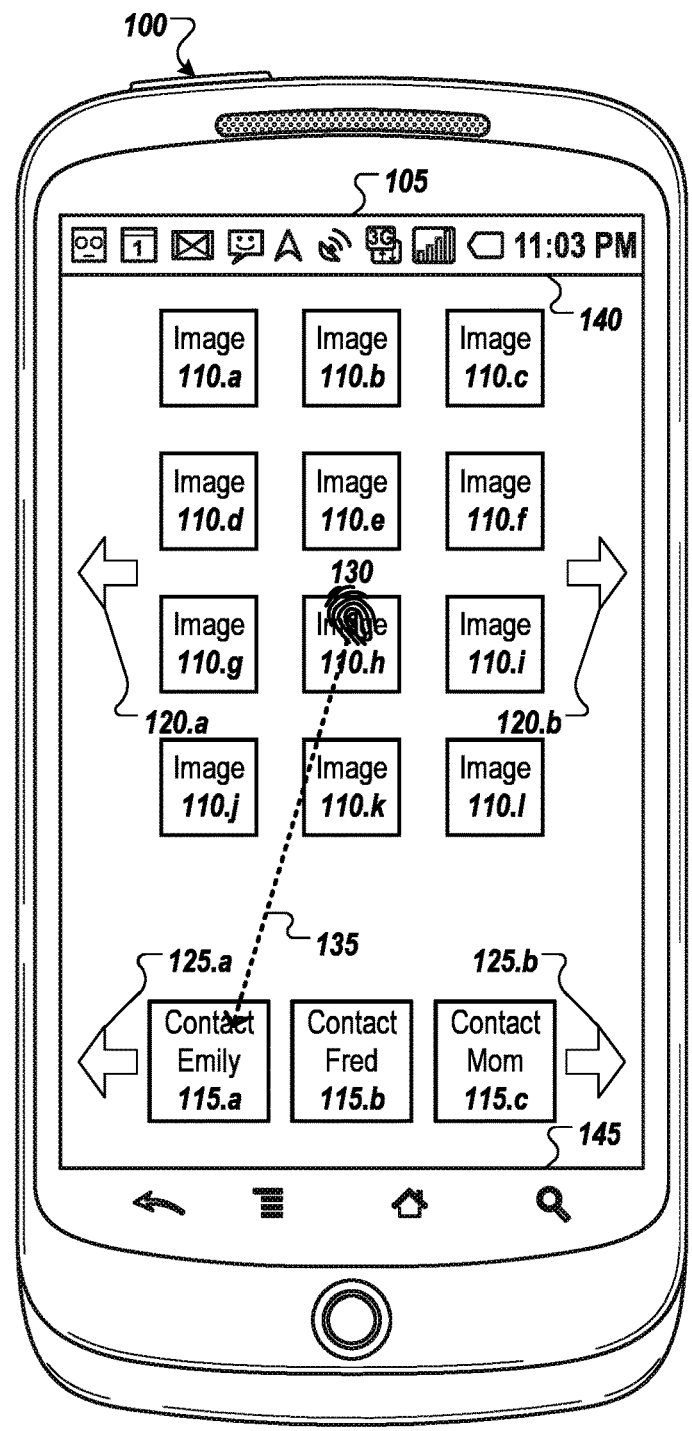
FIG. 1 illustrates an exemplary mobile device for transmitting a multimedia messaging service message.

FIG. 1 illustrates an exemplary mobile device 100 for transmitting an MMS message. As illustrated, the mobile device 100 is a mobile phone. However, the mobile device may be any other device configured to receive MMS messages, for example, a tablet computer, a digital music player, or a laptop or desktop computer including a MMS application associated with a mobile telephony account. As shown, the mobile device 100 has a touchscreen that presents a visual user interface 105. The mobile device 100 may be executing an MMS application, which presents the visual user interface 105 at the touchscreen.

The visual user interface 105 presents thumbnails 110.a-110.l of multiple images from an image library of the mobile device. While the thumbnails 110.a-110.l are illustrated as corresponding to images, each thumbnail 110 may correspond to any type of file, for example, a video file. Also, any number of thumbnails, not necessarily 12, may be presented in the visual user interface 105. If there are more thumbnails available than are presented in the visual user interface 105, the user may scroll through the thumbnails using scroll buttons 120.a and 120.b or by swiping to the left or to the right (or, alternatively, up or down).

The visual user interface 105 also presents contact blocks 115.a-115.c. Each contact block identifies a contact (e.g., Emily, Fred, or Mom) associated with an MMS address (e.g., a mobile device number (MDN)) to which MMS message(s) may be sent. Any number of contact blocks, not necessarily three, may be presented in the visual user interface 105. If there are more contacts available than are presented in the visual user interface 105, the user may scroll through the contacts using the scroll buttons 125.a and 125.b or by swiping to the left or to the right (or, alternatively, up or down).

As shown, the thumbnails 110.*a*-110.*l* and the contact blocks 115.*a*-115.*c* are presented adjacent to opposite edges of the visual user interface 105. Specifically, the thumbnails 110.*a*-110.*l* are presented adjacent to the top edge 140 and the contact blocks 115*a*-115.*c* are presented adjacent to the bottom edge 145. However, in alternative implementations, the thumbnails 110.*a*-110.*l* and the contact blocks 115*a*-115.*c* may be presented adjacent to any edge or any two opposite edges.

In order to send an MMS message, a user may select a thumbnail of a file the user desires to send via MMS and drag and drop the thumbnail to the contact block of the contact to whom the file is to be sent. For example, as shown, the user has selected thumbnail 110.*h* by placing his/her finger 130 on thumbnail 110.*h*. The user then moved his/her finger 130 along path 135 to drag and drop the selected thumbnail 110.*h* to contact 115.*a*, named Emily. The file associated with the thumbnail 110.*h* may be sent to the MMS messaging address (e.g., MDN) associated with Emily using MMS. The file may be sent to the MMS messaging address associated with Emily as soon as the user drops the selected thumbnail 110.*h* on the contact block 115.*a* corresponding to Emily. Alternatively, the user may be presented with an interface for adding text to the MMS message to Emily. The interface for adding text to the MMS message may be presented on the visual user interface 105 of the mobile device 100 and may include, for example, a block into which the user may type text via keyboard presented on the touchscreen.

Advantageously, the interface presented in FIG. 1 allows a user to easily select a file to transmit via MMS message and a contact to whom the file should be transmitted. As shown, the files/images are close to the top of the device and the contacts are close to the bottom of the device due to the fact that users can more quickly move their fingers from top to bottom than from bottom to top, regardless of whether they are right-handed or left-handed. An alternative design may have files/images at the left and contacts at the right, due to the convenience for right-handed users of moving their fingers from left to right. However, this alternative design may be inconvenient for left-handed users. In some examples, a user may select an edge next to which the files/images are placed and an opposite edge next to which the contacts are placed. In these examples, the user may make the selection based on what is easier for the user and based on whether the user is right-handed or left-handed.

Figure 2:
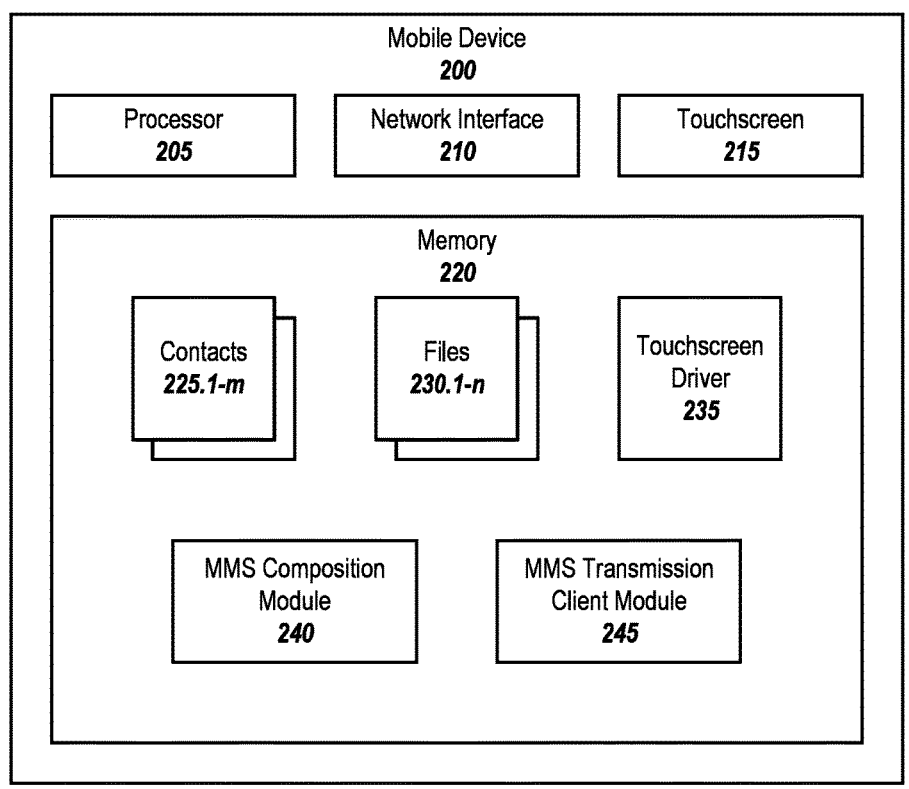
FIG. 2 is a high-level functional block diagram of an exemplary mobile device for transmitting a multimedia messaging service message.

FIG. 2 is a high-level functional block diagram of an exemplary mobile device 200 for transmitting an MMS message. The mobile device 200 may correspond to the mobile device 100 illustrated in FIG. 1. As shown, the mobile device 200 includes a processor 205, a network interface 210, a touchscreen 215, and a memory 220. The processor 205 executes instructions stored in a machine-readable medium, for example, the memory 220. While a single processor 205 is illustrated, the mobile device 200 may include multiple processors, which may be arranged into processing units, such as a central processing unit (CPU) or a graphics processing unit (GPU). The network interface 210 allows the mobile device 200 to access a network, for example, a cellular network for transmitting MMS messages, transmitting text messages, making calls, accessing cellular data, etc., or a WiFi network. The touchscreen 215 displays a graphical user interface (GUI), for example, the visual user interface 105 of FIG. 1, and receives touch input for processing by the processor 205 based on instructions stored in the memory 220. The memory 220 stores data and/or instructions. As shown, the memory 220 stores contacts 225.*l*-*m*, files 230.*l*-*n*, a touchscreen driver 235, a MMS composition module 240, and a MMS transmission client module 245.

The contacts 225.*l*-225.*m* include a contact list of the user of the mobile device 200. Each contact 225.*p* (where p is a number between 1 and m) may be associated with one or more of a name, a telephone number, an email address, a postal address, a fax number, social networking information, etc. The files 230.*l*-230.*n* include files stored locally at the mobile device 200. Each file 230.*q* (where q is a number between 1 and n) may include a photograph, a video, an audio file, a word processing document, a spreadsheet, a presentation file, etc.

The touchscreen driver 235 includes instructions which, when executed by the processor 205, cause the processor 205 to provide visual output at the touchscreen 215 and/or receive touch input via the touchscreen 215. The type of visual output and/or the responses by the mobile device 200 to the touch input may be determined based on programmed instructions stored in the memory 220, for example, instructions in the MMS composition module 240, as discussed below. In some examples, the visual output corresponds to the visual user interface 105 of FIG. 1, and the touch input corresponds to the user touching the touchscreen 215 with his/her finger 130 and moving his/her finger 130 along path 135 on the touchscreen 215.

The MMS composition module 240 includes instructions which, when executed by the processor 205, cause the processor 205 to present, at the touchscreen 215 and using the touchscreen driver 235, a visual user interface that includes thumbnails corresponding to some or all of the files 230.*l*-230.*n* and contact blocks corresponding to some or all of the contacts 225.*l*-225.*m*. The processor 205 receives, via the touchscreen 215 and using the touchscreen driver 235, a selection of a first thumbnail from among the thumbnails. The processor 205 receives, via the touchscreen 215 and using the touchscreen driver 235, an indication of dragging (e.g., using a finger or a stylus) the first thumbnail across the visual user interface on the touchscreen 215 to a first contact block from among the contact blocks. The processor 205 then invokes the MMS transmission client module 245. The MMS transmission client module 245 includes instructions which, when executed by the processor 205, cause the processor 205 to transmit the file 230.*q* (where q is a number between 1 and n) identified in the thumbnail to the MMS messaging address (e.g., MDN) of the contact 225.*p* identified in the first contact block.

Figure 3:
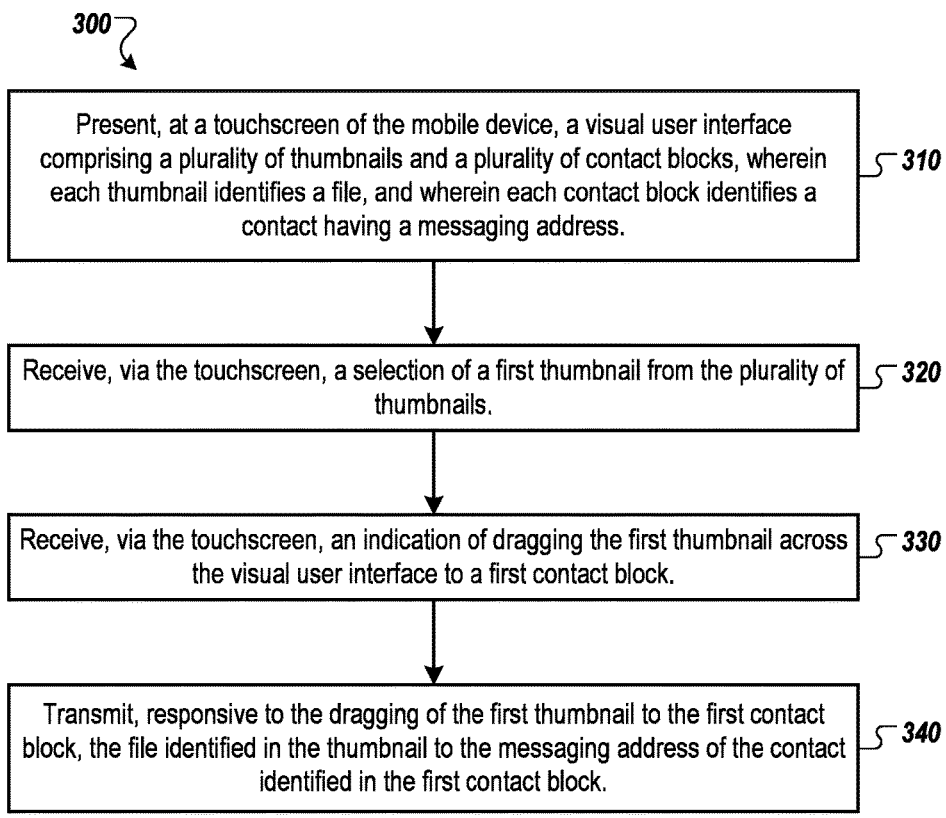
FIG. 3 is a flow chart illustrating an exemplary process for generating a multimedia messaging service message at a mobile device.

FIG. 3 is a flow chart illustrating an exemplary process 300 for generating an MMS message at a mobile device. The process 300 begins at step 310, where a mobile device (e.g., mobile device 100 or 200) presents at the touchscreen (e.g., touchscreen 215) a visual user interface (e.g., visual user interface 105). The visual user interface includes multiple thumbnails (e.g., thumbnails 110.*a*-110.*l*) and multiple contact blocks (e.g., contact blocks 115.*a*-115.*c*). Each thumbnail identifies a file (e.g., one of the files 230.*l*-230.*n*). Each contact block identifies a contact (e.g., one of the contacts 225.*l*-225.*m*) having a MMS messaging address. For example, each contact block may include a name of the identified contact. The name may be a first name, a last name, or a combination of the first name and the last name.

In one example, the contact blocks are presented next to a top edge of the visual user interface, and the thumbnails are presented next to a bottom edge of the visual user interface. Alternatively, the contact blocks and the thumbnails may be presented adjacent to the right edge and the left edge, respectively, of the visual user interface. In other implementations, the contact blocks and the thumbnails may be presented anywhere on the visual user interface. In some examples, the contact blocks and the thumbnails may be interspersed with one another.

In one example, the contact blocks correspond to all of the contacts of the user and are arranged alphabetically. If there are more contacts than can fit in the visual user interface, the user may be able to scroll through the contacts, for example, by swiping the contacts to the left, to the right, up or down, by using arrows for scrolling, or by using a scroll bar and a scroll thumb. In one example, the contact blocks correspond to the favorite contacts of the user, and the user may swipe to view other, non-favorite contacts. In yet another example, the contact blocks correspond to the contacts of the user to whom the user has sent the largest number of MMS messages during the last threshold time period (e.g., last week, last month, last three months, etc.). The length of the threshold time period may be determined based on how frequently the user sends MMS messages. For example, for a user who sends an average of 10 MMS messages per day, the threshold time period may be one week. For a user who sends an average of 1 MMS message per week, the threshold time period may be one per year.

In some examples, the displayed contact blocks may correspond to the most frequent contacts of the user. The frequent contacts of the user may include contacts with whom the user most frequently communicates using a mobile device-based communication. The mobile device-based communication may include, for example, cellular phone calls, text messages, MMS messages, email messages sent from the mobile device, or social network-based contact using the mobile device. The mobile device may determine the contacts with whom the user most frequently communicates based on a number of times that the user has communicated with the contact during a predetermined time period (e.g., last week, last two weeks, last two months, etc.) The length of the predetermined time period may be determined based on how frequently the user communicates using the mobile device. For example, a user who uses the mobile device to communicate 40-50 times per day, on average, may have a predetermined time period of one day. A user who uses the mobile device to communicate once or only a few times per day, on average, may have a predetermined time period of two months.

In step 320, the mobile device receives, via the touchscreen, a selection of a first thumbnail from the multiple thumbnails. For example, the user may touch the touchscreen, at a position corresponding to first thumbnail, using a finger or a stylus. In step 330, the mobile device receives, via the touchscreen, an indication of dragging the first thumbnail across the visual user interface to a first contact block from among the multiple contact blocks. In step 340, the mobile device transmits, via a messaging server and responsive to the dragging of the first thumbnail to the first contact block, the file identified in the thumbnail to the MMS messaging address of the contact identified in the first contact block. A push connection is established between the mobile device and the messaging server, and between the messaging server and a device associated with the messaging address. As a result of this two-way push connection, the file may be transmitted from the mobile device to the device associated with the messaging address in real-time. After step 340, the process 300 ends.

Aspects of the subject technology related to a mobile device are discussed, for example, in conjunction with FIGS. 1-3. Aspects of the subject technology related to a MMS server are discussed, for example, in conjunction with FIGS. 4 and 5. The mobile device aspects and the MMS server aspects of the subject technology may be implemented together with one another or independently of and separately from one another.

According to some implementations, an MMS server receives, from a sender mobile device, a message including a recipient device address (e.g., an MDN, such as +1-917-555-1234) and a file (e.g., an image file, a video file, or any other file). The message may be pushed to the MMS server from the sender mobile device. The MMS server attempts to transmit the file to a recipient mobile device associated with the recipient device address. In a case where the attempt to transmit the file is successful, the MMS server receives an acknowledgement that the file was received at the mobile device. The MMS server in response to receiving the acknowledgement deletes the file from the memory of the MMS server. The MMS server also in response to receiving the acknowledgement transmits to the sender mobile device an indication that the file is successfully transmitted to the recipient mobile device.

In a case where the attempt to transmit the file is unsuccessful, the MMS server reattempts to transmit the file to the recipient mobile device. The reattempt may occur a certain amount of time (e.g., 10 minutes, 1 hour, 3 hours, etc.) after the previous attempt, depending on the load of the MMS server. The MMS server retains the file in a memory of the MMS server until the file is successfully transmitted to the recipient mobile device, a request to cancel the attempt to transmit the file is received from the sender mobile device, a threshold time period (e.g., three hours or six hours) passes after receipt of the message from the sender mobile device, or a threshold number (e.g., five or ten) of attempts to transmit the MMS message to the recipient have been made. The threshold time period or the threshold number of attempts may be determined based on the identity of the mobile device transmitting the MMS message, the type of file being transmitted, or the size of the file. For example, the threshold time period or the threshold number of attempts may be larger if the mobile device is a smartphone rather than a non-smart phone, if the type of file is an image rather than a video, or if the size of the file is smaller. In some cases, the MMS server may determine a failure reason why the attempt to transmit the file is unsuccessful. The MMS server may transmit to the sender mobile device an indication of the failure reason, so that the user of the sender mobile device may decide whether to reattempt to send the message at a different time or to attempt to send the message to another contact. For example, a father may attempt to send a photograph of his child playing with a toy to his sister. The MMS server may determine that the sister's mobile device is offline and inform the father of this determination. In response, the father may decide to resend the message hour(s) or day(s) later when the sister is likely to be online. Alternatively, the father may decide to resend the message to the sister's husband, who the father knows to be online and in the same geographic location as the sister. Alternatively, the father may decide to forego sending the photograph to the sister as it is not important or urgent. Exemplary failure reasons may include: the recipient mobile device is offline, the recipient mobile device is busy, or the recipient mobile device lacks memory to store the file. The MMS server may determine that the recipient mobile device is offline by attempting to contact the recipient mobile device and failing to receive a response. The MMS server may determine that the recipient mobile device is busy by communicating with other server(s) belonging to the mobile operator (e.g., a mobile data server, a voice calling server, etc.) and determining that the other servers are providing data to the mobile device. The MMS server may determine that the recipient mobile device lacks memory to store the file by attempting to transmit the file to the mobile device and receiving a "lack of memory error" response from the mobile device.

Figure 4:
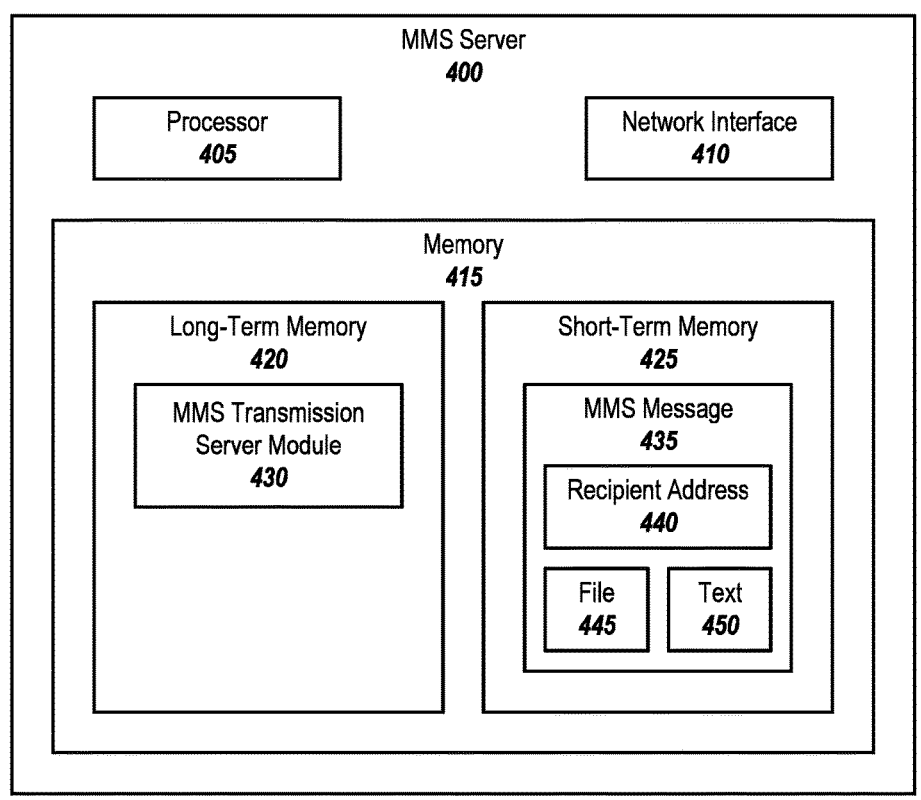
FIG. 4 is a high-level functional block diagram of an exemplary multimedia messaging service server.

FIG. 4 is a high-level functional block diagram of an exemplary MMS server 400. While the MMS server 400 is illustrated as a single machine, the MMS server 400 may include a single machine or multiple machines. As shown, the MMS server 400 includes a processor 405, a network interface 410, and a memory 415. The processor 405 executes instructions stored in a machine-readable medium, for example, the memory 415. While a single processor 405 is illustrated, the mobile device 200 may include multiple processors, which may be arranged into processing units, such as a CPU or a GPU. The network interface 410 allows the MMS server 400 to access a network, for example, a cellular network for transmitting MMS messages, transmitting text messages, making calls, accessing cellular data, etc., or a WiFi network.

The memory 415 stores data and/or instructions. As shown, the memory 415 includes a long-term memory 420 and a short-term memory 425. The long-term memory 420 may include data and/or instructions that are rarely removed and may be occasionally (e.g., once every month or year) modified, for example, via software updates. The short-term memory 425 includes data and/or instructions that are erased or cleared frequently, for example, after a MMS message is successfully received at a recipient device. Data may be stored in the short-term memory 425 for 10 seconds, 1 minute, 5 minutes, 1 hour, etc.

As illustrated, the short-term memory 425 stores a MMS message 435 that is being processed by the MMS server 400. While a single MMS message 435 is illustrated, the short-term memory 425 may store multiple MMS messages which are simultaneously being processed by the MMS server 400. The MMS message 435 includes a recipient address 440, a file 445, and text 450. In some cases, the MMS message 435 may lack text 450. After the MMS message 435 is successfully transmitted to a device associated with the recipient address 440, the MMS message 435, including the recipient address 440, the file 445, and the text 450, may be removed from the short-term memory 425 and stored only at a device of the sender and the device associated with the recipient address 440.

As illustrated, the long-term memory 420 stores an MMS transmission server module 430. The MMS transmission server module 430 may include code which, when executed by the processor 405, causes the processor 405 to receive the MMS message 435 from a sender device (e.g., mobile device 100 or 200) and to transmit the MMS message 435 to a device associated with the recipient address 440. After the MMS message 435 is received at the device associated with the recipient address 440, the MMS message 435, including the attached file 445, may be removed from the short-term memory 425. One example of the operation of the MMS transmission server module 430 is described in conjunction with FIG. 5.

Figure 5:
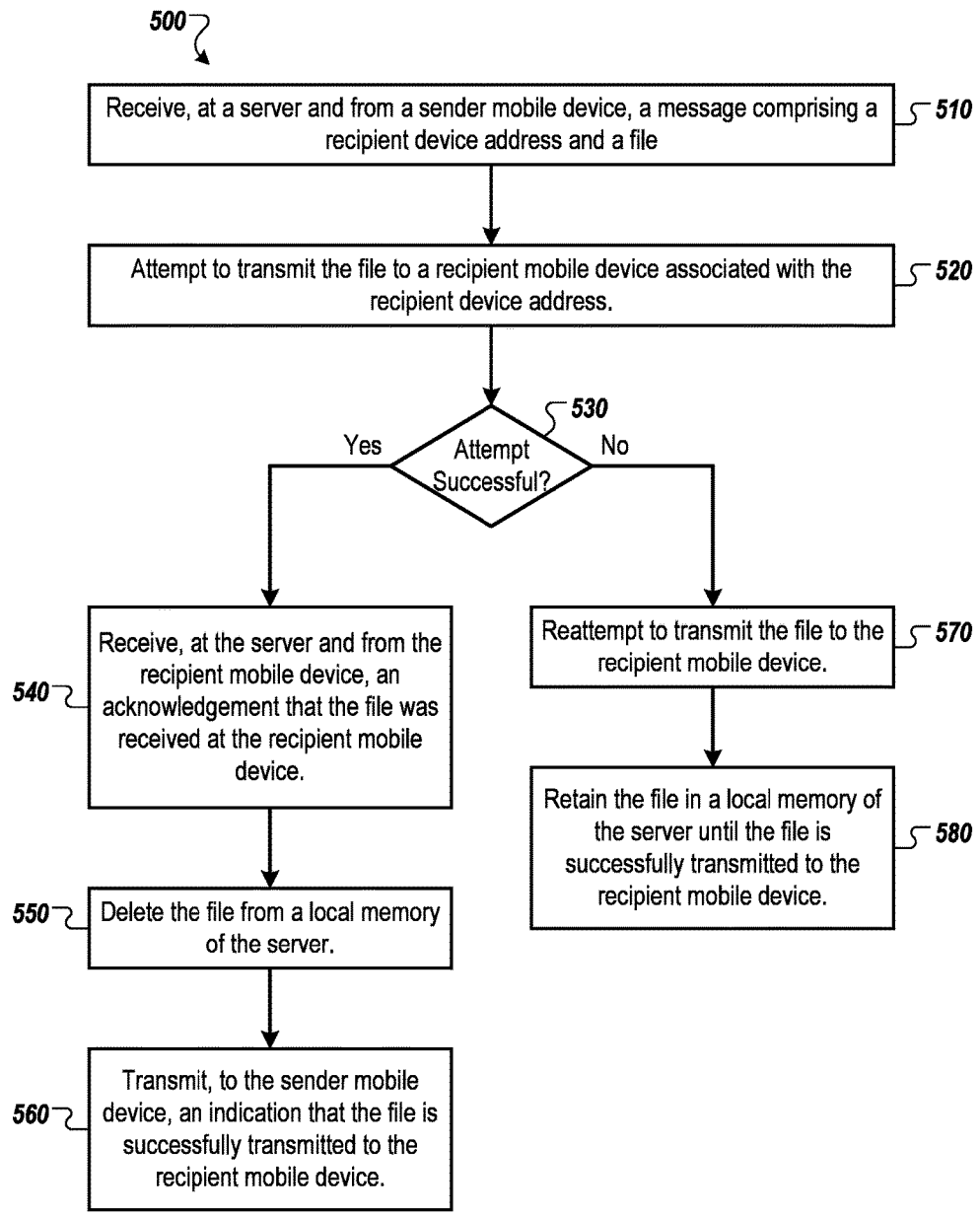
FIG. 5 is a flow chart illustrating an exemplary process for transmitting a multimedia messaging service message.

FIG. 5 is a flow chart illustrating an exemplary process 500 for transmitting an MMS message. The process 500 begins at step 510, where a server (e.g., MMS server 400, executing the MMS transmission server module 430) receives, from a sender mobile device (e.g., mobile device 100 or 200), a message (e.g., MMS message 435) including a recipient device address (e.g., recipient address 440) and a file (e.g., file 445). The message may, in some cases, also include text (e.g., text 450). The file may be an image file or a video file.

In step 520, the server attempts to transmit the file to a recipient mobile device associated with the recipient device address. For example, the server may push the file to the recipient mobile device in real-time after receiving, from the sender mobile device, the message including the recipient device address and the file. The recipient device address may be an MDN, and the recipient mobile device may be a mobile device having the MDN. Alternatively, the recipient device address may be an email address or a social networking account identifier, and the recipient device may be a mobile device associated with the email address or the social networking account identifier.

In step 530, the process 500 branches based on whether the attempt to transmit the file to the recipient mobile device associated with the recipient device address was successful. If the attempt to transmit the file to the recipient mobile device associated with the recipient device address was successful, the process 500 continues to step 540. If the attempt to transmit the file to the recipient mobile device associated with the recipient device address is unsuccessful, the process 500 continues to step 570.

In step 540, if the attempt to transmit the file to the recipient mobile device was successful, the server receives, from the recipient mobile device, an acknowledgement that the MMS message, including the file, was received at the recipient mobile device. In step 550, the server deletes the file from a local memory (e.g., memory 415) of the server. In step 560, the server transmits, to the sender mobile device, an indication that the file is successfully transmitted to the recipient mobile device. After step 560, the process 500 ends.

In step 570, if the attempt to transmit the file to the recipient mobile device is unsuccessful, the server reattempts to transmit the file to the recipient mobile device. The server may transit, to the sender mobile device, an indication that the attempt to transmit the file is unsuccessful. In some cases, the server may determine a failure reason why the attempt to transmit the file is unsuccessful. For example, the server may determine that the recipient mobile device is offline, that the recipient mobile device is busy, or that the recipient mobile device lacks memory to store the attached file. The server may transmit to the sender mobile device an indication of the failure reason.

In step 580, the server retains the file in the local memory of the server until the file is successfully transmitted to the recipient mobile device. Upon successful transmission of the file to the recipient mobile device, the file is deleted from the local memory of the server. After step 580, the process 500 ends.

As described above in conjunction with FIG. 5, the server retains the file in the local memory of the server until the file is successfully transmitted to the recipient mobile device. However, in alternative implementations, the server may remove the message, including the file and the recipient device address, from its local memory under different circumstances. For example, the server may remove the message from its local memory upon receiving, from the sender mobile device, a request to cancel the attempt to transmit the file. The server may remove the message from its local memory when a waiting time period passes after receipt of the message from the sender mobile device. The waiting time period may be programmed into the server and may be, for example, 6 hours, 12 hours, or 24 hours. The waiting period may vary depending on an amount of free memory at the server or an amount of traffic on the network. If the network has low traffic or the server has a large amount of free memory, the waiting period may be longer. Alternatively, if the network has high traffic or the server has a small amount of free memory, the waiting period may be shorter.

Figure 6:
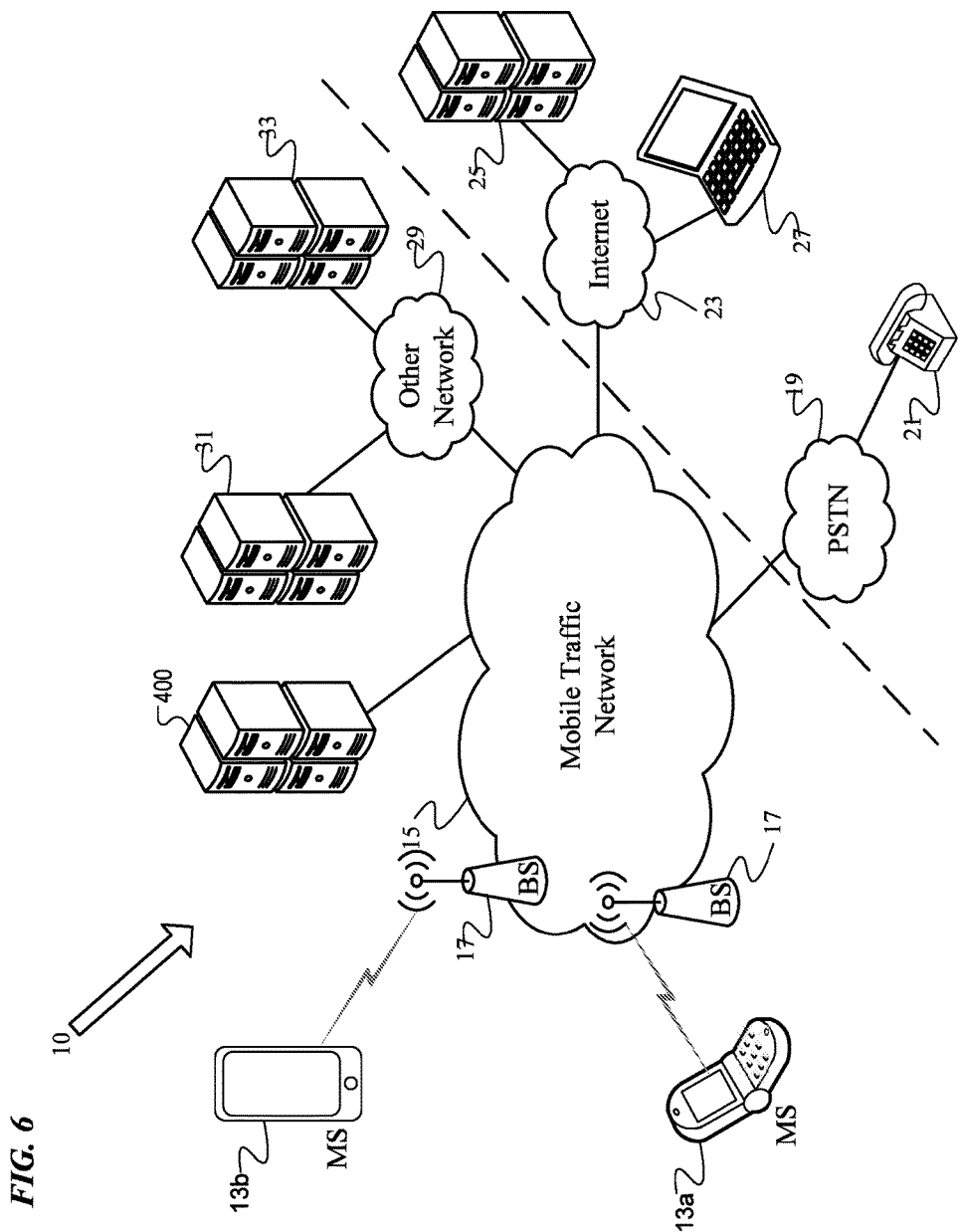
FIG. 6 is a high-level functional block diagram of an example of a system of networks/devices that provide various communications for mobile stations, using which multimedia messaging service communication may be implemented.

FIG. 6 illustrates a system 10 offering a variety of mobile communication services. The mobile communication services include MMS services, offered through the MMS server 400, as described herein. The example shows simply two mobile stations (MSs) 13a and 13b as well as a mobile communication network 15. The mobile stations 13a and 13b are examples of mobile stations. The network 15 provides mobile wireless communications services to those stations as well as to other mobile stations (not shown), for example, via a number of base stations (BSs) 17. Each of the mobile stations 13a and 13b may correspond to a mobile device transmitting a MMS message, such as the mobile device 100 or 200, or a mobile device receiving a MMS message. The present techniques may be implemented in or used in any of a variety of available mobile networks 15, and the drawing shows only a very simplified example of a few relevant elements of the network 15 for purposes of discussion here.

The wireless mobile communication network 15 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard, the Universal Mobile Telecommunications System (UMTS) standard, the LTE standard belonging to 3GPP or other standards used for public mobile wireless communications. The mobile stations 13 may be capable of voice telephone communications through the network 15. Alternatively or additionally, the mobile stations 13a and 13b may be capable of data communications through the particular type of network 15 (and the users thereof typically will have subscribed to data service through the network).

The network 15 allows users of the mobile stations such as 13a and 13b (and other mobile stations not shown) to initiate and receive telephone calls to each other as well as through the public switched telephone network or "PSTN" 19 and telephone stations 21 connected to the PSTN. The network 15 typically offers a variety of data services via the Internet 23, such as downloads, web browsing, email, etc. The network 15 offers MMS services to the users of the mobile stations, for example 13a and 13b, through the MMS server 400, which is connected to the network 15. By way of example, the drawing shows a laptop PC type user terminal 27 as well as a server 25 connected to the Internet 23; and the data services for the mobile stations 13 via the Internet 23 may be with devices like those shown at 25 and 27 as well as with a variety of other types of devices or systems capable of data communications through various interconnected networks.

Mobile stations 13 can take the form of portable handsets, smart-phones or personal digital assistants, although they may be implemented in other form factors. Program applications can be configured to execute on many different types of mobile stations 13. For example, a mobile station application can be written to execute on a binary runtime environment for mobile (BREW-based) mobile station, a Windows Mobile based mobile station, Android, I-Phone, Java Mobile, or RIM based mobile station such as a BlackBerry or the like. Some of these types of devices can employ a multi-tasking operating system.

The mobile communication network 10 can be implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile stations 13, can include one or more RANs and a regional circuit and/or packet switched network and associated signaling network facilities.

Physical elements of a RAN operated by one of the mobile service providers or carriers, include a number of base stations represented in the example by the base stations (BSs) 17. Although not separately shown, such a base station 17 can include a base transceiver system (BTS), which can communicate via an antennae system at the site of base station and over the airlink with one or more of the mobile stations 13, when the mobile stations are within range. Each base station can include a BTS coupled to several antennae mounted on a radio tower within a coverage area often referred to as a "cell." The BTS is the part of the radio network that sends and receives RF signals to/from the mobile stations 13 that are served by the base station 17.

The radio access networks can also include a traffic network represented generally by the cloud at 15, which carries the user communications and data for the mobile stations 13 between the base stations 17 and other elements with or through which the mobile stations communicate. The network can also include other elements that support functionality other than device-to-device media transfer services such as messaging service messages and voice communications.

Specific elements of the network 15 for carrying the voice and data traffic and for controlling various aspects of the calls or sessions through the network 15 are omitted here form simplicity. It will be understood that the various network elements can communicate with each other and other aspects of the mobile communications network 10 and other networks (e.g., the public switched telephone network (PSTN) and the Internet) either directly or indirectly.

The carrier will also operate a number of systems that provide ancillary functions in support of the communications services and/or application services provided through the network 10, and those elements communicate with other nodes or elements of the network 10 via one or more private IP type packet data networks 29 (sometimes referred to as an Intranet), i.e., a private networks. Generally, such systems are part of or connected for communication via the private network 29. A person skilled in the art, however, would recognize that systems outside of the private network could serve the same functions as well. Examples of such systems, in this case operated by the network service provider as part of the overall network 10, which communicate through the intranet type network 29, include one or more application servers 31 and a related authentication server 33 for the application service of server 31.

A mobile station 13 communicates over the air with a base station 17 and through the traffic network 15 for various voice and data communications, e.g. through the Internet 23 with a server 25 and/or with application servers 31. Services offered by the mobile service carrier may be hosted on a carrier operated application server 31, for communication via the networks 15 and 29. Server such as 25 and 31 may provide any of a variety of common application or service functions in support of or in addition to an application program running on the mobile station 13. For a given service, an application program within the mobile station may be considered as a 'client' and the programming at 25 or 31 may be considered as the 'server' application for the particular service.

To insure that the application service offered by server 31 is available to only authorized devices/users, the provider of the application service also deploys an authentication server 33. The authentication server 33 could be a separate physical server as shown, or authentication server 33 could be implemented as another program module running on the same hardware platform as the server application 31. Essentially, when the server application (server 31 in our example) receives a service request from a client application on a mobile station 13, the server application provides appropriate information to the authentication server 33 to allow server application 33 to authenticate the mobile station 13 as outlined herein. Upon successful authentication, the server 33 informs the server application 31, which in turn provides access to the service via data communication through the various communication elements (e.g. 29, 15 and 17) of the network 10.

The subject technology may be implemented in conjunction with touch screen type mobile stations as well as to non-touch type mobile stations. Hence, our simple example shows the mobile station (MS) 13*a* as a non-touch type mobile station and shows the mobile station (MS) 13 as a touch screen type mobile station. Some implementation may involve at least some execution of programming in the mobile stations as well as implementation of user input/output functions and data communications through the network 15, from the mobile stations. Those skilled in the art presumably are familiar with the structure, programming and operations of the various types of mobile stations. However, for the sake of completeness two types of mobile stations are described below with respect to FIGS. 7 and 8.

The mobile stations of FIGS. 7 and 8 may correspond to the mobile device 100 or 200 or to a mobile device receiving an MMS message. FIG. 7 illustrates exemplary non-touch type mobile device. FIG. 8 illustrates an exemplary touch screen type mobile device.

As shown by the above discussion, functions relating to MMS communication may be implemented on computers connected for data communication via the components of a packet data network, as shown in FIG. 6. For example, the mobile device 100 or 200 may correspond to the mobile station 13*a* or the mobile station 13*b*. The MMS server 400 may correspond to the application servers 31. Although special purpose devices may be used, such devices also may be implemented using one or more hardware platforms intended to represent a general class of data processing device commonly used to run "server" programming so as to implement the functions discussed above, albeit with an appropriate network connection for data communication.

FIG. 7 provides a block diagram illustration of an exemplary non-touch type mobile device 13*a*, which may correspond to the mobile device 13. Although the mobile device 13*a* may be a smart-phone or may be incorporated into another device, such as a personal digital assistant (PDA) or the like, for discussion purposes, the illustration shows the mobile device 13*a* is in the form of a handset. The handset embodiment of the mobile device 13*a* functions as a normal digital wireless telephone station. For that function, the mobile device 13*a* includes a microphone 702 for audio signal input and a speaker 704 for audio signal output. The microphone 702 and speaker 704 connect to voice coding and decoding circuitry (vocoder) 706. For a voice telephone call, for example, the vocoder 706 provides two-way conversion between analog audio signals representing speech or other audio and digital samples at a compressed bit rate compatible with the digital protocol of wireless telephone network communications or voice over packet (Internet Protocol) communications.

For digital wireless communications, the mobile device 13*a* also includes at least one digital transceiver (XCVR) 708. The mobile device 13*a* may be configured for digital wireless communications using one or more of the common network technology types. The concepts discussed here encompass embodiments of the mobile device utilizing any digital transceivers that conform to current or future developed digital wireless communication standards. The mobile device may also be capable of analog operation via a legacy network technology.

The transceiver 708 provides two-way wireless communication of information, such as vocoded speech samples and/or digital information, in accordance with the technology of the network 165. The transceiver 708 also sends and receives a variety of signaling messages in support of the various voice and data services provided via the mobile device 13*a* and the communication network. Each transceiver 708 connects through RF send and receive amplifiers (not separately shown) to an antenna 710. The transceiver may also support various types of mobile messaging services, such as short message service (SMS), enhanced messaging service (EMS) and/or multimedia messaging service (MMS).

The mobile device 13*a* includes a display 718 for displaying messages, menus or the like, call related information dialed by the user, calling party numbers, etc. A keypad 720 enables dialing digits for voice and/or data calls as well as generating selection inputs, for example, as may be keyed-in by the user based on a displayed menu or as a cursor control and selection of a highlighted item on a displayed screen. The display 718 and keypad 720 are the physical elements providing a textual or graphical user interface. Various combinations of the keypad 720, display 718, microphone 702 and speaker 704 may be used as the physical input output elements of the graphical user interface (GUI), for multimedia (e.g., audio and/or video) communications. Of course other user interface elements may be used, such as a trackball, as in some types of PDAs or smart phones.

In addition to normal telephone and data communication related input/output (including message input and message display functions), the user interface elements also may be used for display of menus and other information to the user and user input of selections.

A microprocessor 712 serves as a programmable controller for the mobile device 13*a*, in that it controls all operations of the mobile device 13*a* in accordance with programming that it executes, for all normal operations, including those under consideration here. In the example, the mobile device 13*a* includes flash type program memory 714, for storage of various "software" or "firmware" program routines and mobile configuration settings, such as mobile directory number (MDN) and/or mobile identification number (MIN), etc. The flash type program memory 714 stores programmed instructions, including those described herein. The mobile device 13*a* may include a non-volatile random access memory (RAM) 716 for a working data processing memory. Of course, other storage devices or configurations may be added to or substituted for those in the example. In a present implementation, the flash type program memory 714 stores firmware such as a boot routine, device driver software, an operating system, call processing software and vocoder control software, and any of a wide variety of other applications, such as client browser software and short message service software. The memories 714, 716 also store various data, such as telephone numbers and server addresses, downloaded data such as multimedia content, and various data input by the user. Programming stored in the flash type program memory 714, sometimes referred to as "firmware," is loaded into and executed by the microprocessor 712.

As outlined above, the mobile device 13*a* includes a processor, and programming stored in the flash memory 714 configures the processor so that the mobile device is capable of performing various desired functions, including those described herein.

For purposes of such a discussion, FIG. 8 provides a block diagram illustration of an exemplary touch screen type mobile device 13*b*. Although possible configured somewhat differently, at least logically, a number of the elements of the exemplary touch screen type mobile device 13*b* are similar to the elements of mobile device 13*a*, and are identified by like reference numbers in FIG. 8. For example, the touch screen type mobile device 13*b* includes a microphone 702, speaker 704 and vocoder 706, for audio input and output functions, much like in the earlier example. The mobile device 13*b* also includes at least one digital transceiver (XCVR) 708, for digital wireless communications, although the mobile device 13*b* may include an additional digital or analog transceiver. The concepts discussed here encompass embodiments of the mobile device 13*b* utilizing any digital transceivers that conform to current or future developed digital wireless communication standards. As in the mobile device 13*a*, the transceiver 708 provides two-way wireless communication of information, such as vocoded speech samples and/or digital information, in accordance with the technology of the network 165. The transceiver 708 also sends and receives a variety of signaling messages in support of the various voice and data services provided via the mobile device 13*b* and the network 165. Each transceiver 708 connects through RF send and receive amplifiers (not separately shown) to an antenna 710. The transceiver may also support various types of mobile messaging services, such as short message service (SMS), enhanced messaging service (EMS) and/or multimedia messaging service (MMS).

As in the example of the mobile device 13*a*, a microprocessor 712 serves as a programmable controller for the mobile device 13*b*, in that it controls all operations of the mobile device 13*b* in accordance with programming that it executes, for all normal operations, and for operations described herein. In the example, the mobile device 13*b* includes flash type program memory 714, for storage of various program routines and mobile configuration settings. The mobile device 13*b* may also include a non-volatile random access memory (RAM) 716 for a working data processing memory. Of course, other storage devices or configurations may be added to or substituted for those in the example. Hence, outlined above, the mobile device 13*b* includes a processor, and programming stored in the flash memory 714 configures the processor so that the mobile device is capable of performing various desired functions, including the functions described herein.

In the example of FIG. 8, the user interface elements included a display and a keypad. The mobile device 13*b* may have a limited number of key(s) 730, but the user interface functions of the display and keypad are replaced by a touchscreen display arrangement. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the exemplary mobile device 13*b* includes a display 722, which the microprocessor 712 controls via a display driver 724, to present visible outputs to the device user. The mobile device 13*b* also includes a touch/position sensor 726. The sensor 726 is relatively transparent, so that the user may view the information presented on the display 722. A sense circuit 728 sensing signals from elements of the touch/position sensor 726 and detects occurrence and position of each touch of the screen formed by the display 722 and sensor 726. The sense circuit 728 provides touch position information to the microprocessor 712, which can correlate that information to the information currently displayed via the display 722, to determine the nature of user input via the screen.

The display 722 and touch sensor 726 (and possibly one or more keys 730, if included) are the physical elements providing the textual and graphical user interface for the mobile device 13*b*. The microphone 702 and speaker 704 may be used as user interface elements for audio input and output.

The structure and operation of the mobile devices 13*a* and 13*b*, as outlined above, were described to by way of example, only.

Figure 9:
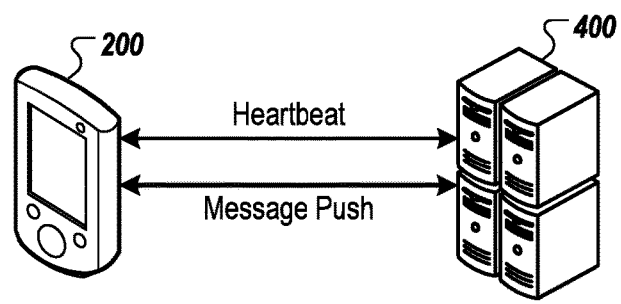
FIG. 9 illustrates a first exemplary system in which push communication may be implemented.

FIG. 9 illustrates a first exemplary system 900 in which push communication may be implemented. As shown, the system 900 includes the mobile device 200 and the MMS server 400, described above in conjunction with FIG. 2 and FIG. 4, respectively. A persistent hypertext transfer protocol (HTTP) or hypertext transfer protocol secure (HTTPS) connection is maintained between the mobile device 200 and the MMS server 400 while both the mobile device 200 and the MMS server are online. The mobile device 200 may be offline if it is turned off, placed in airplane mode, or taken outside a network coverage area. The MMS server 400 may be taken offline due to damage or maintenance of the MMS server 400. The persistent HTTP connection is used to send (e.g., push) outgoing MMS messages from the mobile device 200 to the MMS server 400 and to send (e.g., push) incoming MMS messages from the MMS server 400 to the mobile device 200. Messages are sent (e.g., pushed) between the mobile device 200 and the MMS server 400 using the message push link shown in FIG. 9. As shown, the mobile device 200 and the MMS server 400 also send heartbeat messages to keep the connection alive. The heartbeat messages may be sent once every 2 minutes, 4 minutes, 10 minutes, etc., depending on the load of the mobile device 200 and/or the load of the MMS server 400.

Figure 10:
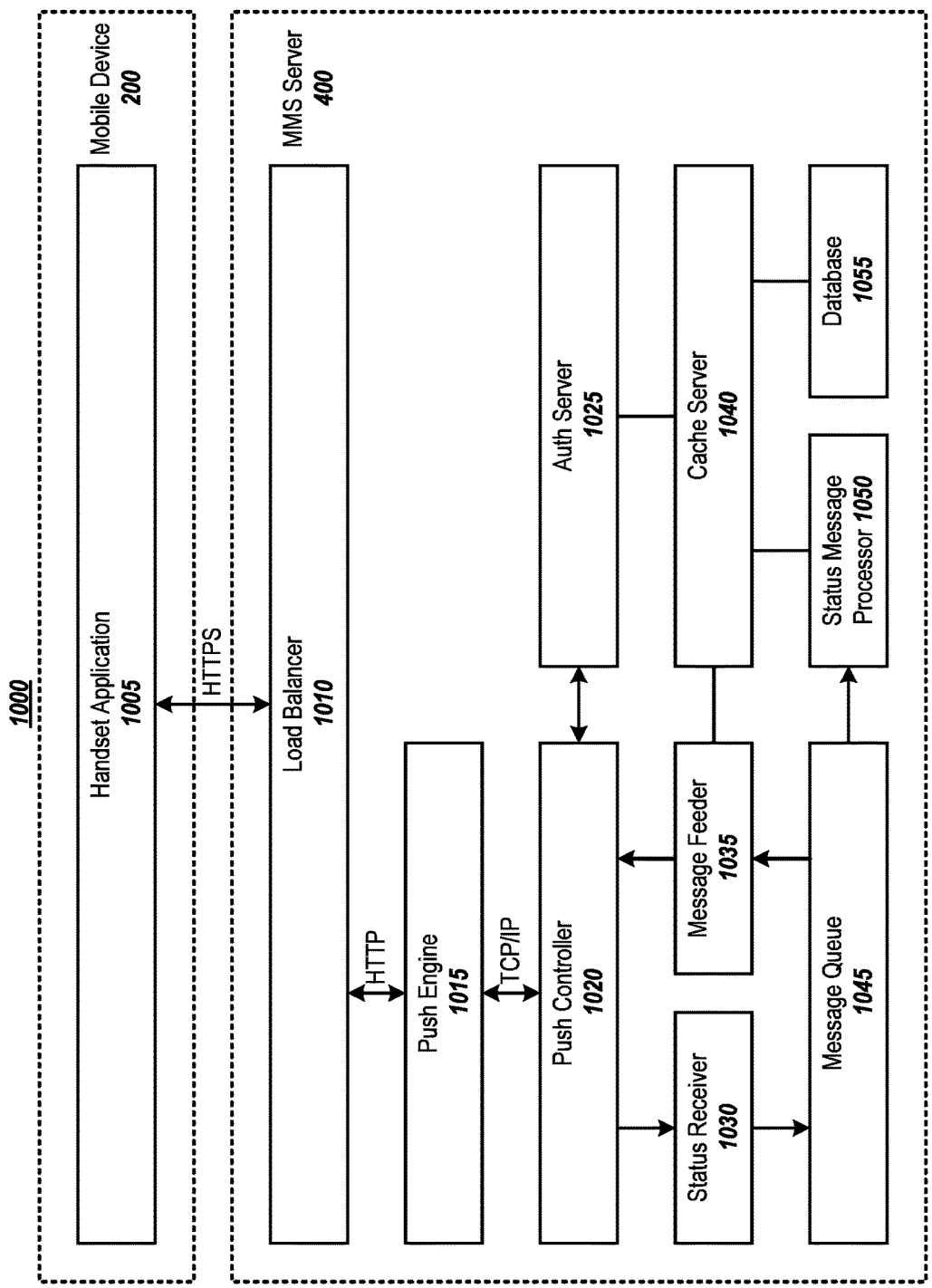
FIG. 10 illustrates a second exemplary system in which push communication may be implemented.

FIG. 10 illustrates a second exemplary system 1000 in which push communication may be implemented. As shown, the system 1000 includes a handset application 1005, a load balancer 1010, a push engine 1015, a push controller 1020, an auth server 1025, a status receiver 1030, a message feeder 1035, a cache server 1040, a message queue 1045, a status message processor 1050, and a database 1055. The handset application 1005 may reside on the mobile device 200. The remaining structures 1010, 1015, 1020, 1025, 1030, 1035, 1040, 1045, 1050, and 1055 shown in FIG. 10 may reside at the MMS server 400. While a single one of each of structure 1005, 1010, 1015, 1020, 1025, 1030, 1035, 1040, 1045, 1050, and 1055 is shown, the system 1000 may be implemented with multiple of any of these structures. In some examples, two or more of the above structures may be combined into a single structure or may reside on the same machine.

The handset application 1005 is deployed at the mobile device 200. The handset application initiates the persistent connection between the mobile device 200 and the MMS server 400 (e.g., the load balancer 1010 component of the MMS server 400 as shown in FIG. 10). The handset application 1005 maintains the persistent connection using heartbeat messages. The handset application 1005 receives push MMS messages over the persistent connection and provides the received messages to other application(s) (e.g., a user interface application) at the mobile device 200 for processing.

The push engine 1015 is responsible for accepting the persistent connection at the MMS server 400 side. The push engine 1015 sends messages to the handset application 1005 and receives acknowledgements from the handset application 1005. The load balancer 1010 makes sure that messages are processed in a manner not to overload the mobile device 200 or the MMS server 400. For example, a maximum of 1 message per second, 2 messages per second, etc., may be processed depending on the processing speeds of the mobile device 200 and the MMS server 400. The remaining messages may be queued for processing by the load balancer 1010.

The push controller 1020 is responsible for message routing. In an environment with multiple push engines 1015, the push controller 1020 stores information regarding which push engine 1015 is associated with which mobile device 200. Using this stored information, the push controller 1020 forwards messages received at the MMS server 400 to the correct push engine 1015 for further processing.

The auth server 1025 is responsible for authenticating the mobile device 200 using the credentials (e.g., mobile device number, subscriber identity module information, etc.). Once the mobile device 200 is authenticated, the auth server sends, to the mobile device 200 and through the push controller 1020, a unique session identifier (ID) for the mobile device 200.

The status receiver 1030 is responsible for forwarding the success/failure message status to the messaging queue 1045 from the push controller 1020. The status receiver may be called jreceiver. The message feeder 1035 is responsible for receiving message(s) from the messaging queue 1045 and forwarding the received message(s) to the push controller 1020.

The message queue 1045 represents the message queuing system. The message queue 1045 stores messages that need to be sent to the mobile device 200. Also, the message queue 1045 holds success or failure messages that need to be processed further. The status message processor 1050 processes the success/failure status of messages.

The cache server 1040 caches records of transmitted and received messages in the database 1055 for future access. The database 1055 may store device information of mobile devices 200 connected to the MMS server 400 and information about transmitted and received MMS messages.

The following process may be implemented in conjunction with the system 1000 of FIG. 10. The handset application 1005 sends the authentication and connection request to the push engine 1015 with the device credentials of the mobile device 200 hosting the handset application. The push engine 1015 forwards the authentication details to the push controller 1020. The push controller 1020 forwards the authentication details to the auth server 1025. After successful validation, the auth server 1025 sends the session ID, the mobile device number, and/or other registered application details to the push controller 1020. The push controller forwards the session ID and the other registered application details to the mobile device 200. After successful authentication, a persistent HTTP or HTTPS connection is maintained between the push engine 1005 and the handset application 1005 of the mobile device 200. The push engine 1015 sends the heartbeat message to the handset application 1005 to maintain the persistent connection.

The following process for transmitting a message may be implemented in conjunction with the system 1000 of FIG. 10. A message for a particular mobile device 200 is pushed into the message queue 1045. The message may be an MMS message received from another mobile device. The message feeder 1035 pulls the message from the message queue 1035. The message feeder 1035 forwards the message to the push controller 1020. The push controller 1020 identifies the correct push engine 1015 based on the mobile device number of the destination mobile device 200 and forwards the message to that push engine 1015. The push engine 1015 pushes the message to the handset application 1005 of the mobile device 200.

Figure 11:
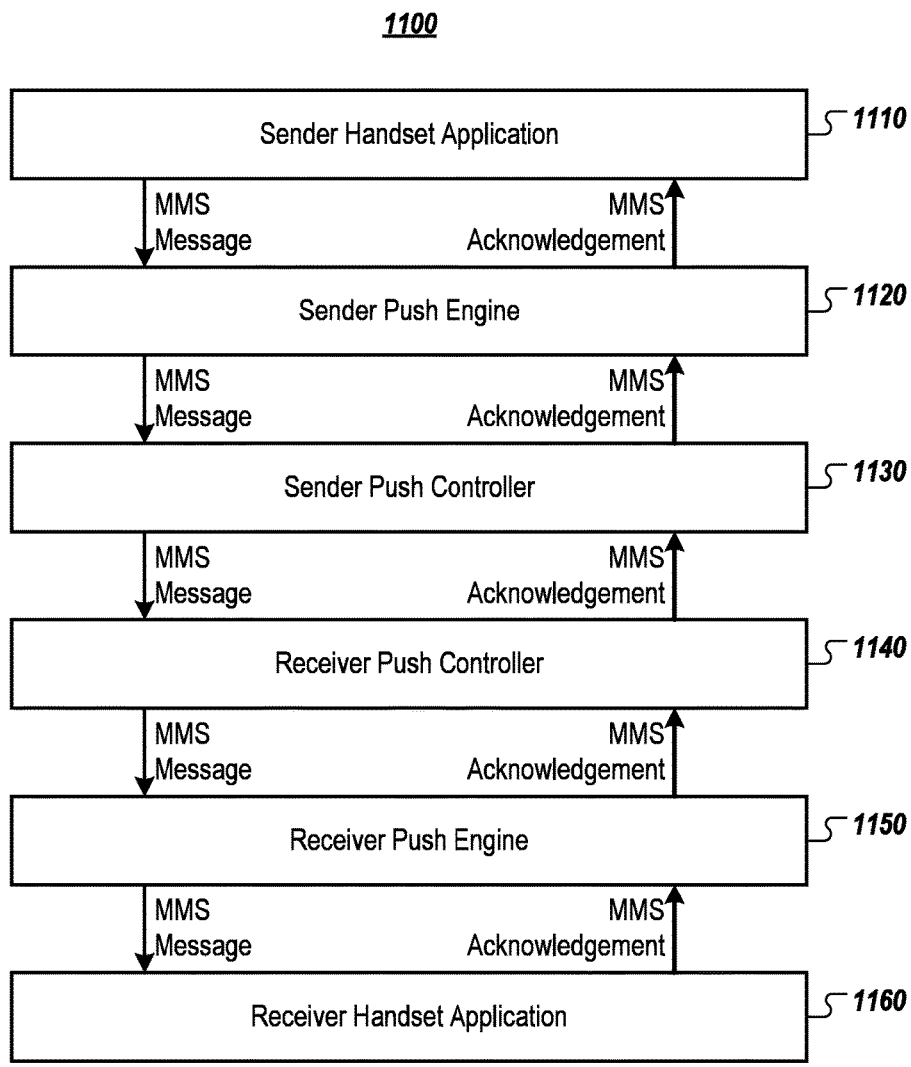
FIG. 11 is a data flow diagram of transmitting a multimedia messaging service message using push communication.

FIG. 11 is a data flow diagram 1100 of transmitting a multimedia messaging service message using push communication. As shown in FIG. 11, the sender handset application 1110 sends a MMS message, addressed to a receiver mobile device having a receiver handset application 1160, to the sender push engine 1120. The sender push engine 1120 has a persistent connection with the sender handset application 1110. The sender push engine 1120 forwards the MMS message to a connected push controller, the sender push controller 1130. The sender push controller forwards the message to the receiver push controller 1140. The sender push controller 1130 identifies the receiver push controller 1140 based on the mobile device number to which the MMS messages is addressed. The receiver push controller 1140 forwards the MMS message to the receiver push engine 1150, which holds the persistent connection to the receiver mobile device hosting the receiver handset application 1160. The receiver push engine 1150 forwards the MMS message to the receiver handset application 1160.

After receiving the MMS message, the receiver handset application 1160 sends a MMS message acknowledgement to the receiver push engine 1150. The receiver push engine 1150 forwards the acknowledgement to the connected push controller, which is the receiver push controller 1140. The receiver push controller 1140 forwards the acknowledgement to the sender push controller 1130. The receiver push controller 1140 identifies the sender push controller 1130 based on the mobile device number of the sender mobile device. The sender push controller 1130 forwards the acknowledgement to the sender push engine 1120. The sender push engine forwards the acknowledgement to the sender handset application 1110. As a result of this process, the MMS message is transmitted from the sender mobile device to the receiver mobile device, and an acknowledgment is transmitted back to the sender mobile device from the receiver mobile device.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and may be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, should may they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    receiving, at a server and from a sender mobile device, a message comprising a recipient device address and a file;
    attempting to transmit the file to a recipient mobile device associated with the recipient device address, wherein a first connection is established between the server and the sender mobile device and a second connection is established between the server and the recipient mobile device;
    determining whether an attempt to transmit the file from the server to the recipient mobile device is successful;
    if the attempt to transmit the file is successful:
        receiving, at the server and from the recipient mobile device, an acknowledgement that the file was received at the recipient mobile device;
        deleting, in response to receiving the acknowledgement, the file from a local memory of the server; and
        transmitting, to the sender mobile device, an indication that the file was successfully transmitted to the recipient mobile device; and
    if the attempt to transmit the file to the recipient mobile device is unsuccessful:
        reattempting to transmit the file to the recipient mobile device; and
        retaining the file in the local memory of the server until the file is successfully transmitted to the recipient mobile device, wherein, upon successful transmission of the file to the recipient mobile device, the file is deleted from the local memory of the server.

2. The method of claim 1, wherein the recipient device address comprises a multimedia messaging service (MMS) address.

3. The method of claim 1, further comprising in response to determining that the attempt to transmit the file is unsuccessful, transmitting, to the sender mobile device, an indication that the attempt to transmit the file is unsuccessful.

4. The method of claim 1, further comprising in response to determining that the attempt to transmit the file is unsuccessful:
    determining a failure reason for the attempt to transmit the file being unsuccessful; and
    transmitting, to the sender mobile device, an indication of the failure reason.

5. The method of claim 4, wherein the failure reason includes at least one of the recipient mobile device being offline, the recipient mobile device being busy, or the recipient mobile device lacking memory to store the file.

6. The method of claim 1, wherein attempting to transmit the file to the recipient mobile device associated with the recipient device address comprises pushing the file to the recipient device address in real-time after receiving, from the sender mobile device, the message comprising the recipient device address and the file.

7. The method of claim 1, further comprising in response to determining that the attempt to transmit the file is unsuccessful, retaining the file in the local memory of the server until at least one of:
    the file is successfully transmitted to the recipient mobile device,
    a request to cancel the attempt to transmit the file is received from the sender mobile device, or
    a threshold time period passes after receipt of the message from the sender mobile device.

8. The method of claim 1, wherein the file comprises at least one of an image file or a video file.

9. A system comprising:
    one or more processors;
    a communication module communicatively coupled to the one or more processor; and
    a memory, communicatively coupled to the one or more processors in which are stored instructions comprising instructions that when executed by the one or more processors cause the one or more processors to:

receive from a sender mobile device, a message comprising a recipient device address and a file;
attempt to transmit the file to a recipient mobile device associated with the recipient device address, wherein a first connection is established between the communication module and the sender mobile device and a second connection is established between the communication module and the recipient mobile device;
determine whether an attempt to transmit the file to the recipient mobile device is successful;
if the attempt to transmit the file is successful:
receive, from the recipient mobile device, an acknowledgement that the file was received at the recipient mobile device;
delete, in response to receiving the acknowledgement, the file from the memory; and
transmit, to the sender mobile device, an indication that the file is successfully transmitted to the recipient mobile device; and
if the attempt to transmit the file to the recipient mobile device is unsuccessful:
reattempt to transmit the file to the recipient mobile device; and
retain the file in the memory until the file is successfully transmitted to the recipient mobile device, wherein, upon successful transmission of the file to the recipient mobile device, the file is deleted from the memory.

10. The system of claim 9, wherein the recipient device address comprises a multimedia messaging service (MMS) address.

11. The system of claim 9, wherein the file comprises at least one of an image file or a video file.

12. The system of claim 9, wherein the instructions when executed by the one or more processors further cause the one or more processors to: in response to determining that the attempt to transmit the file is unsuccessful, transmit, to the sender mobile device, an indication that the attempt to transmit the file is unsuccessful.

13. The system of claim 9, wherein the instructions when executed by the one or more processors further cause the one or more processors to: in response to determining that the attempt to transmit the file is unsuccessful:
determine a failure reason explaining the attempt to transmit the file being unsuccessful; and
transmit, to the sender mobile device, an indication of the failure reason.

14. The system of claim 13, wherein the failure reason includes at least one of the recipient mobile device being offline, the recipient mobile device being busy, or the recipient mobile device lacking memory to store the file.

15. The system of claim 9, wherein the instructions when executed by the one or more processors further cause the one or more processors to, in response to determining that the attempt to transmit the file is unsuccessful, retain the file in the memory until at least one of:
the file is successfully transmitted to the recipient mobile device,
a request to cancel the attempt to transmit the file is received from the sender mobile device, or
a threshold time period passes after receipt of the message from the sender mobile device.

16. A non-transitory computer readable medium on which are stored instructions that when executed cause a programmable device to:
receive from a sender mobile device, a message comprising a recipient device address and a file;
attempt to transmit the file to a recipient mobile device associated with the recipient device address;
determine whether an attempt to transmit the file to the recipient mobile device is successful;
if the attempt to transmit the file is successful:
receive from the recipient mobile device, an acknowledgement that the file was received at the recipient mobile device;
delete, in response to receiving the acknowledgement, the file from a local memory; and
transmit, to the sender mobile device, an indication that the file is successfully transmitted to the recipient mobile device; and
if the attempt to transmit the file to the recipient mobile device is unsuccessful:
reattempt to transmit the file to the recipient mobile device; and
retain the file in the local memory until the file is successfully transmitted to the recipient mobile device, wherein, upon successful transmission of the file to the recipient mobile device, the file is deleted from the local memory.

17. The non-transitory computer readable medium of claim 16, wherein the instructions when executed further cause the programmable device to transmit, to the sender mobile device, an indication that the attempt to transmit the file is unsuccessful, in response to determining that the attempt to transmit the file is unsuccessful.

18. The non-transitory computer readable medium of claim 16, wherein the instructions when executed further cause the programmable device to, in response to determining that the attempt to transmit the file is unsuccessful:
determine a failure reason explaining the attempt to transmit the file being unsuccessful; and
transmit, to the sender mobile device, an indication of the failure reason.

19. The non-transitory computer readable medium of claim 18, wherein the failure reason includes at least one of the recipient mobile device being offline, the recipient mobile device being busy, or the recipient mobile device lacking memory to store the file.

20. The non-transitory computer readable medium of claim 16, wherein the instructions when executed further cause the programmable device to, in response to determining that the attempt to transmit the file is unsuccessful, retain the file in the local memory until at least one of:
the file is successfully transmitted to the recipient mobile device,
a request to cancel the attempt to transmit the file is received from the sender mobile device, or
a threshold time period passes after receipt of the message from the sender mobile device.

* * * * *